United States Patent [19]

Ripert

[11] 4,281,680

[45] Aug. 4, 1981

[54] SWING CHECK VALVE CONSTRUCTION

[75] Inventor: Roger L. Ripert, Concord, Calif.

[73] Assignee: Grove Valve and Regulator Company, Oakland, Calif.

[21] Appl. No.: 67,325

[22] Filed: Aug. 17, 1979

[51] Int. Cl.³ .................... F16K 15/03; F16K 15/18
[52] U.S. Cl. ........................... 137/527.4; 137/527.8; 137/454.2; 251/82
[58] Field of Search .............. 137/527, 527.2, 527.4, 137/527.6, 527.8, 454.2; 251/82, 298, 299, 367, 315, 366

[56] References Cited

U.S. PATENT DOCUMENTS

| 2,282,532 | 5/1942 | Shenk | 137/527.4 |
| 3,144,876 | 8/1964 | Frye | 137/527.6 X |
| 3,478,778 | 11/1969 | Curtiss et al. | 137/527.4 |
| 3,522,929 | 8/1970 | DeSimone | 251/298 |
| 3,819,150 | 6/1974 | Kajrup | 251/366 X |
| 3,875,963 | 4/1975 | Buck et al. | 137/527.8 |

Primary Examiner—William R. Cline
Attorney, Agent, or Firm—Melvin R. Stidham

[57] ABSTRACT

A pipeline swing check valve comprising a fabricated valve body with a fabricated cylindrical hub member welded therein. The clapper is hinged, not to the body, but directly to the hub member or some part thereon so that it can be mounted and adjusted for proper seating without handling the entire valve, and then installed with the hub member as a unit.

4 Claims, 3 Drawing Figures

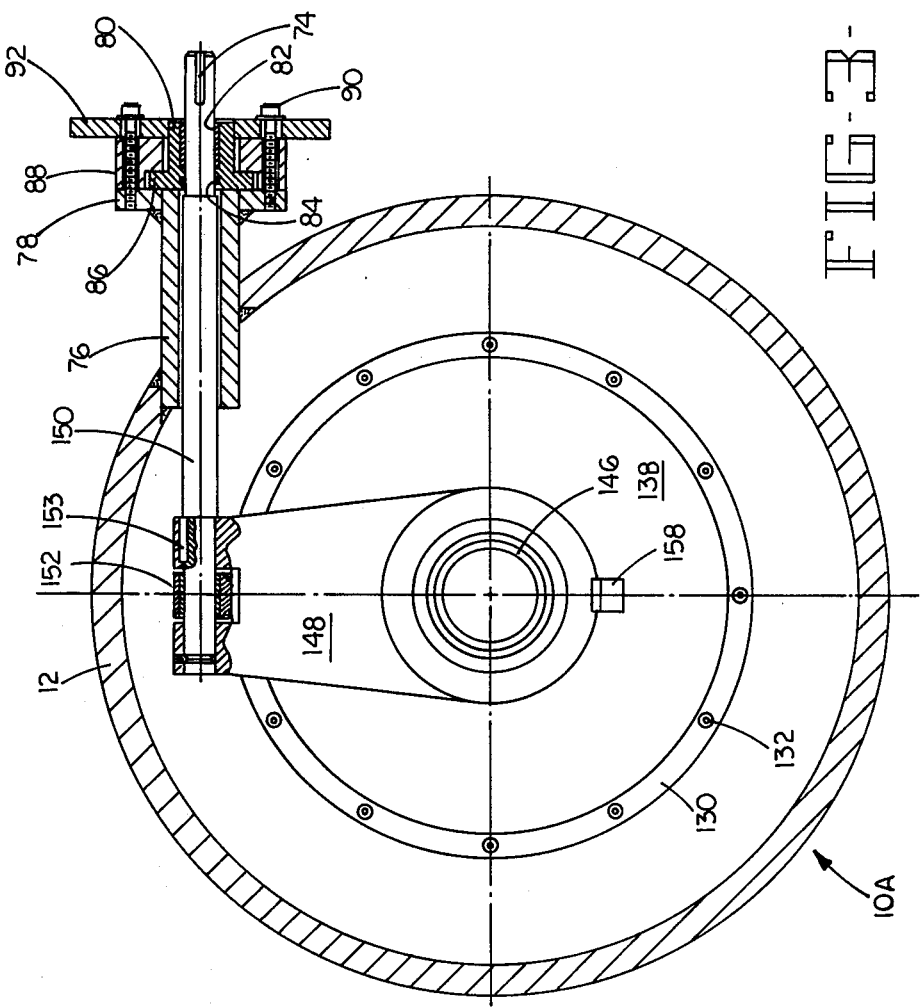
FIG-3-
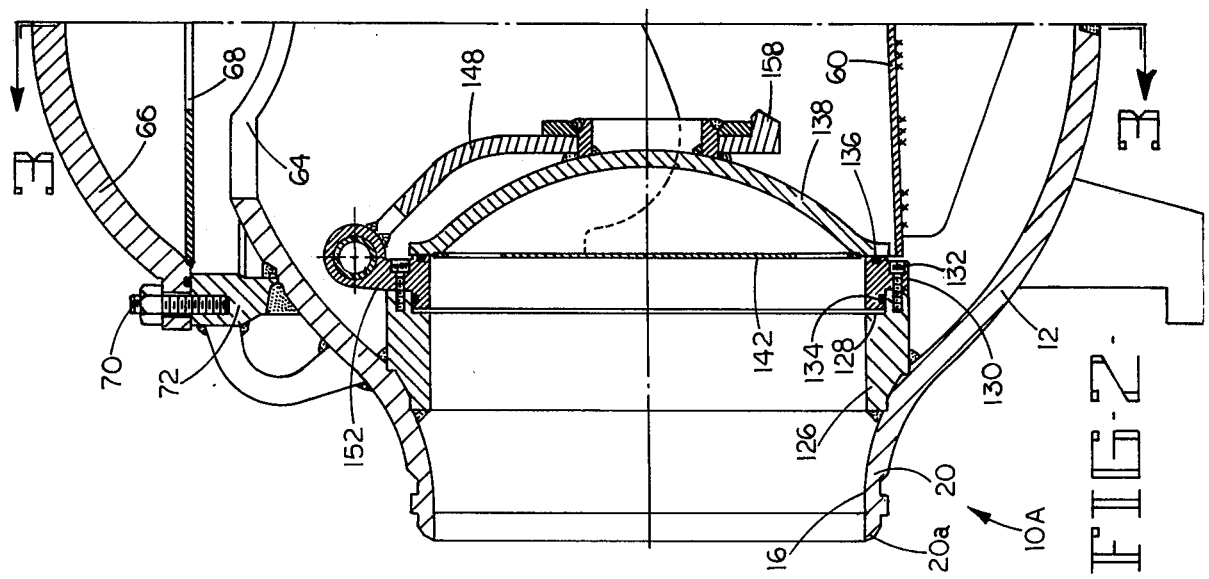
FIG-2-

4,281,680

SWING CHECK VALVE CONSTRUCTION

BACKGROUND OF THE INVENTION

Swing check valves are currently available for installation into large pipelines 24 inches in diameter and larger. One such check valve is shown in U.S. Pat. No. 3,897,804. The valve body is formed of spherical configuration, and separately formed cylindrical hubs, one of which carries a seat ring, are welded into body openings. The valve clapper is hinged to the valve body so as to swing down into closed position and seat firmly against the seat ring. However, attaining the accurate relationship between the clapper shaft center line and the sealing face between the seat and the clapper, in order to insure proper seating, requires extremely tedious and accurate machine work while handling a heavy, bulky and unwieldy member, i.e. the complete valve body.

OBJECTS OF THE INVENTION

It is an object of this invention to provide a method of mounting a clapper in a swing check valve that does not require handling the complete valve body.

It is a further object of this invention to provide a swing check valve with a clapper which is easily and precisely mounted with respect to the valve seat.

Other objects and advantages of this invention will become apparent from the description to follow, particularly when read in conjunction with the accompanying drawings.

BRIEF SUMMARY OF THE INVENTION

In carrying out this invention, the swing check valve is provided with a clapper, which in closed position seats firmly against a seat ring carried on a hub member welded into the valve body around a flow passage. The clapper is pivoted, not on the valve body, but on the hub member which carries the seat ring, and the positioning of the valve shaft is accomplished with the seat hub separate and apart from the valve body. After, proper adjustments are made, the valve clapper and the seat hub are inserted in the body and the seat hub is welded in place.

BRIEF DESCRIPTION OF THE DRAWINGS

In the drawings:

FIG. 2 is a partial vertical section view of a swing check valve including another embodiment of this invention;

FIG. 3 is a section view taken along line 3—3 of FIG. 2.

DESCRIPTION OF PREFERRED EMBODIMENTS

The Embodiment of FIG. 1

Figure 1:
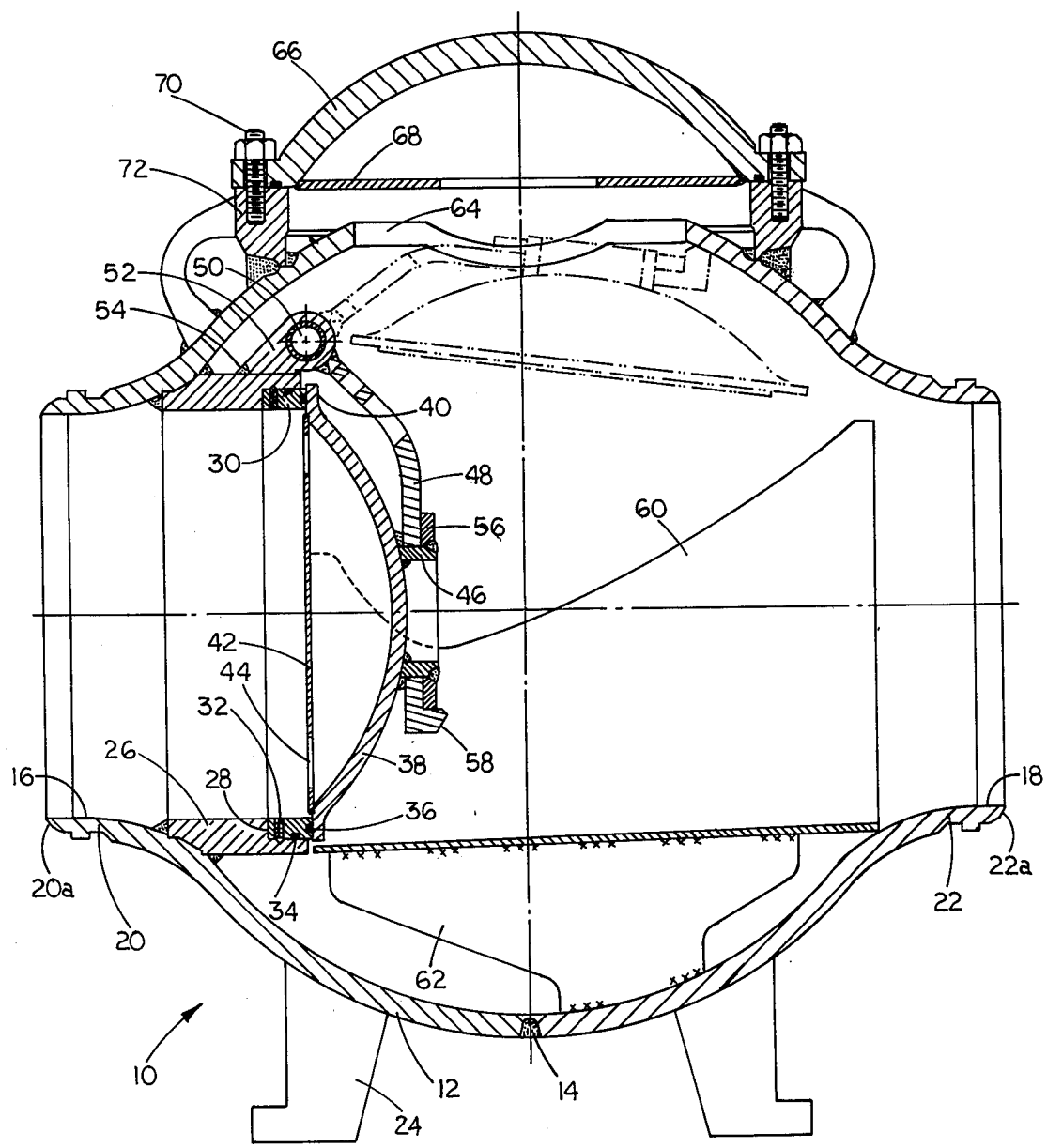
FIG. 1 is a vertical section view of a swing check valve including an embodiment of this invention.

Referring now to FIG. 1 with greater particularity, the swing check valve 10 of this invention includes a spherical main body section 12 which may be fabricated from hemispherical sections, which are formed from steel plates or the like and welded together at 14 along a vertical great circle. The hemispherical sections are formed with upstream and downstream openings 16 and 18 which may be swaged outward to form hubs 20 and 22 of the ultimate pipeline diameter. The hubs 20 and 22 are finished at their ends 20a and 22a for welding into a pipeline, but is to be understood that they may be provided with flanges or otherwise prepared for pipeline installation. Suitable legs 24 may be welded to the spherical body 12 to support the valve erectly, particularly during manufacturing and shipping.

A seat hub 26 is welded into the upstream hub 20 and an annular recess 28 is formed in the inner end thereof in order to accommodate a seat ring 30. The seat ring 30 is secured in place by set screws 32 and an O-ring 34 is provided to seal around the outer surface. A resilient seal ring such as an O-ring 36 is also provided as the main seal for sealing engagement with a clapper 38.

The clapper 38 is preferably of spherical, dished configuration with a substantially radial outer border 40 that seats against the seat ring 30 when the clapper is in its closed position, as shown. The clapper may be reinforced with a disc 42, which is welded across the concave portion thereof, the disc being provided with openings 44 to balance fluid pressure across it.

A cylindrical hub or boss 46 is welded to the back of the clapper 38 and slidably receives the clapper arm 48 which is keyed to a shaft 50. The shaft 50, in turn, is rotatable in a complementary fixed hinge member 52, which is welded at 54 directly to the seat hub 26. A retainer ring 56 is welded to the boss 46 to limit the amount of play of the clapper 38 on the arm 48, but allows enough movement to enable the clapper 38 to accommodate itself to the seat ring 30 and seat firmly thereagainst. A stop 58 at the lower end of the arm 48 engages the interior surface of the body 12 to define the full-open position of the clapper, as shown in phantom.

A partial sleeve 60, which is mounted on legs 62 embraces the clapper 38 and extends across the spherical body 12 to improve flow characteristics and facilitate the passage of pigs and the like, as disclosed in U.S. Pat. No. 3,897,804.

In order to facilitate the introduction and assembly of the clapper 38 and to enable seat replacement, an opening 64 is provided in the top of the spherical body 12, and this is closed by a dome 66 reinforced by a disc 68 and bolted at 70 to a vertical cylindrical flange 72.

Since the fixed hinge 52 is welded directly to the seat hub 26, it is not necessary to handle the complete valve body 12 while the clapper is being mounted. In fact, the clapper 12 may be mounted, and the fixed hinge 52 welded to the hub 26, entirely apart from the valve body 12 and then the hub 26 and clapper 38 may be inserted through the opening 64 as a unit and welded in place.

After checking to ensure that the seat/clapper assembly and shaft fit nicely together, they are disassembled and the seat hub 26 is welded into the body shell 12. Where the shaft 50 is provided merely to suspend the clapper and does not extend outside of the body 12 for selective operation, it may also be practical to assemble the seat, clapper and shaft after the seat hub has been welded in place, but before the body shells 12 have been welded together at 14.

The Embodiment of FIGS. 2 and 3

In describing this embodiment, components which are substantially unchanged from the embodiment of FIG. 1 will bear the same numbers; substitutes and corresponding components will bear the same numbers with a hundreds digit added. Hence, the seat hub 126 is recessed at 128 at its inner end to receive a seat ring 130, which is secured to the end of the seat hub 126 by means of cap screws 132. As in the first embodiment, O-rings 134 and 136 are provided to seal around the seat ring 130 and to engage with the clapper 138. In this embodiment, the fixed hinge component 152 is positioned precisely and welded to the seat ring 130 apart from the valve body and prior to finishing either part. Then, the seat faces and O-ring grooves are machined and, using the seat face as a reference, the hinge pin hole is bored. Finally, the shaft is removed; the seat ring 130 is inserted through the opening 64 and bolted in place; and then the clapper is again positioned and the shaft 150 replaced. This may be done before the body shells 12 are welded together at 14.

The clapper 138 may be operated from outside the valve by rotating the shaft 150 with the wrench or the like applied at the end 74, the shaft being keyed to the clapper at 153. A sleeve 76 extends into the valve body 12 and is welded in place to freely accommodate the shaft 150 and outer bearing collar 80 rotatably receives the outer end of the shaft 150 as provided with a bushing 82 and a suitable seal ring 84. A flange 86 on the collar 80 is secured by a clamping ring 88, as by tightening bolts 90, carried in the plate 92 and threaded into the sleeve flange 78. Hence, the clapper assembly 138, 148 is bolted in place with the seat ring 130, with the shaft 150 extending freely through the sleeve 76. Because of the free fit, no adjustment with respect to the complete valve body 12 is required. Whatever position it assumes, the bearing collar 80 is clamped in place by tightening the screws 90.

While this invention has been described in conjunction with preferred embodiments thereof, it is obvious that modifications and changes therein may be made by those skilled in the art without departing from the spirit and scope of this invention, as defined by the claims appended hereto.

What is claimed as invention is:

1. A swing check valve for a large diameter oil and gas transmission pipeline comprising;
   a generally spherical valve body fabricated from rolled steel;
   outer generally cylindrical hub members integral with said body and formed therefrom with flow passages therethrough, the inner diameters of said outer hub members reducing gradually to the inner diameter of the pipeline at their outer ends;
   a separate cylindrical seat hub member of said inner pipeline diameter welded in said body to extend inward thereof around one of said flow passages and generally axially aligned therewith;
   a seat ring recess cut in the inner end of said seat hub member;
   a valve clapper;
   a seal ring positioned by said seat hub member for engagement by said clapper in the closed position;
   a fixed hinge member having a rotary bearing therethrough mounted on the top portion of said seat hub member without valve body engagement;
   an arm secured at one end to the back of said valve clapper and having a transverse bore through the other end coaxial with said bearing;
   a shaft rotatable in said bearing and secured in said bore; and
   internal access means;
   whereby the clapper may be mounted and adjusted for proper seating with the seat hub member prior to installation of the seat hub member within the valve body.

2. The swing check valve defined by claim 1 including:
   a sleeve extending from said body; substantially coaxially with said bearing and bore;
   said shaft extending through said sleeve with annular clearance to the exterior of said body;
   a bearing collar rotatably receiving said shaft; and
   means clamping said bearing collar to the end of said sleeve.

3. The swing check valve defined by claim 1 including:
   a seat ring secured on the inner end of said seat hub member;
   said seal ring being carried on said seat ring and said fixed hinge member being mounted on said seat ring.

4. The swing check valve defined by claim 1 including:
   a generally cylindrical boss extending generally coaxially from the back of said clapper;
   said arm being axially slidable on said boss and extending upwardly therefrom; and
   restraining means carried on the end of said boss to enable limited axial sliding movement thereof.

* * * * *